(12) United States Patent
Fedus et al.

(10) Patent No.: US 12,093,829 B2
(45) Date of Patent: Sep. 17, 2024

(54) NEURAL NETWORKS WITH SWITCH LAYERS

(71) Applicant: Google LLC, Mountain View, CA (US)

(72) Inventors: William Bradley Fedus, Menlo Park, CA (US); Barret Zoph, San Francisco, CA (US); Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/349,089

(22) Filed: Jul. 7, 2023

(65) Prior Publication Data

US 2023/0351188 A1 Nov. 2, 2023

Related U.S. Application Data

(63) Continuation of application No. PCT/US2022/011707, filed on Jan. 7, 2022.

(60) Provisional application No. 63/134,912, filed on Jan. 7, 2021.

(51) Int. Cl.
*G06N 3/08* (2023.01)
*G06N 3/045* (2023.01)
*G06N 3/082* (2023.01)

(52) U.S. Cl.
CPC ............. *G06N 3/082* (2013.01); *G06N 3/045* (2023.01)

(58) Field of Classification Search
None
See application file for complete search history.

(56) References Cited

U.S. PATENT DOCUMENTS 10,789,427 B2 9/2020 Shazeer et al.
2022/0198254 A1* 6/2022 Dalli ...................... G06N 3/042

FOREIGN PATENT DOCUMENTS

WO WO 2018/085643 5/2018

OTHER PUBLICATIONS

Shazeer et al. "Outrageously Large Neural Networks: The Sparsely-Gated Mixture-Of-Experts Layer", ICLR, 2017, pp. 19.*
Abadi et al., "TensorFlow: A System for Large-Scale Machine Learning," USENIX, 2016, 21 pages.
Berant et al., "Semantic parsing on freebase from question-answer pairs," Proceedings of the 2013 conference on empirical methods in natural language processing, 2013, pp. 1533-1544.
Brown et al., "Language Models are Few-Shot Learners," Advances in Neural Information Processing Systems, 2020, 25 pages.
Bulat et al., "High-capacity expert binary networks," arXiv:2010.03558v1, Oct. 7, 2020, 17 pages.
Child et al., "Generating Long Sequences with Sparse Transformers," arXiv:1904.10509v1, Apr. 23, 2019, 10 pages.
Devlin et al., "BERT:Pre-training of deep bidirectional transformers for language understanding," arXiv1810.04805v2, May 24, 2019, 16 pages.

(Continued)

*Primary Examiner* — Li Wu Chang
(74) *Attorney, Agent, or Firm* — Fish & Richardson P.C.

(57) ABSTRACT

Methods, systems, and apparatus, including computer programs encoded on a computer storage medium, for performing a machine learning task on a network input to generate a network output. In one aspect, one of the systems includes a neural network configured to perform the machine learning task, the neural network including one or more switch layers.

20 Claims, 6 Drawing Sheets

(56) References Cited

OTHER PUBLICATIONS

Fedus et al., "MaskGAN: Better Text Generation via Filling in the ___" arXiv:1801.07736v3, Mar. 1, 2018, 17 pages.
Gale et al., "Sparse GPU Kernels for Deep Learning," SC20: International Conference for High Performance Computing, Networking, Storage and Analysis, Nov. 2020, 14 pages.
Gray et al., "GPU Kernels for block-sparse weights," OpenAI, 2017, 12 pages.
Hinton et al., "Distilling the Knowledge in a Neural Network," arXiv:1503.02531v1, Mar. 9, 2015, 9 pages.
Hochreiter et al., "Long short-term memory," Neural computation, 1997, 9(8):1735-1780.
Huang et al., "CondenseNet: An Efficient DenseNet using Learned Group Convolutions" arXiv:1711.09224, Jun. 7, 2018.
Huang et al., "GPipe: Efficient training of giant neural networks using pipeline parallelism," Advances in neural information processing systems, 2019, pp. 103-112.
International Preliminary Report on Patentability in International Appln. No. PCT/US2022/011707, mailed on Jul. 20, 2023, 8 pages.
International Search Report and Written Opinion in International Appln. No. PCT/US2022/011707, mailed on May 11, 2022, 15 pages.
Jacobs et al., "Adaptive Mixtures of Local Experts," Neural computation, Mar. 1991, 3(1):79-87.
Jordan et al., "Hierarchical Mixtures of Experts and the EM Algorithm," Neural Computation, Mar. 1994, pp. 181-214.
Joshi et al., "TriviaQA: A Large Scale Distantly Supervised Challenge Dataset for Reading Comprehension," arXiv1705.03551v2, May 13, 2017, 11 pages.
Kaplan et al., "Scaling Laws for Neural Language Models," arXiv:2001.08361v1, Jan. 23, 2020, 30 pages.
Kitaev et al., "Reformer: The Efficient Transformer," arXiv:2001.04451v2, Feb. 18, 2020, 12 pages.
Kwiatkowski et al., "Natural Questions: A Benchmark for Question Answering Research," Transactions of the Association for Computational Linguistics, 2019, 7:453-466.
Lample et al., "Large Memory Layers with Product Keys," Advances in Neural Information Processing Systems, 2019, 12 pages.
Lepikhin et al., "GShard: Scaling Giant Models with Conditional Computation and Automatic Sharding," arXiv:2006.16668v1, Jun. 30, 2020, 35 pages.
Narayan et al., "Don't Give Me the Details, Just the Summary! Topic-Aware Convolutional Neural Networks for Extreme Summarization," arXiv1808.08745v1, Aug. 27, 2018, 11 pages.
Radford et al., "Improving language understanding by generative pre-training," OpenAI, 2018, 12 pages.
Raffel et al., "Exploring the limits of transfer learning with a unified text-to-text transformer," The Journal of Machine Learning Research, Jan. 2020, pp. 5485-5551.
Rajpurkar et al., "Squad: 100,000+ Questions for Machine Comprehension of Text," arXiv:1606.05250v3, Oct. 11, 2016, 10 pages.
Ramachandran et al., "Diversity and Depth in Per-Example Routing Models," ICLR, 2019, 12 pages.
Reinforcement learning: An introduction, Sutton et al. (ed.), 2018, 548 pages.
Roberts et al., "How Much Knowledge Can You Pack Into the Parameters of a Language Model?" arXiv:2002.08910v4, Oct. 5, 2020, 9 pages.
Ruder, "An Overview of Multi-Task Learning in Deep Neural Networks," arXiv:1706.05098v1, Jun. 15, 2017, 14 pages.
Sanh et al., "Distilbert, a distilled version of BERT: smaller, faster, cheaper and lighter," arXiv:1910.01108v4, Mar. 1, 2020, 5 pages.
Shazeer et al., "Mesh-TensorFlow: Deep Learning for Supercomputers," Advances in Neural Information Processing Systems, 2018, 10 pages.
Srivastava et al., "Dropout: a simple way to prevent neural networks from overfitting," Journal of Machine Learning Research, Jun. 2014, 15(1):1929-1958.
Strubell et al., "Energy and Policy Considerations for Deep Learning in NLP," arXiv:1906.02243v1, Jun. 5, 2019, 6 pages.
Taylor, "Cloze procedure: A new tool for measuring readability," Journalism quarterly, 1953, 30(4):415-433.
Vaswani et al., "Attention is all you need," Advances in Neural Information Processing Systems, 2017, 11 pages.
Wang et al., "Glue: A Multi-Task Benchmark and Analysis Platform for Natural Language Understanding," arXiv:1804.07461v3, Feb. 22, 2019, 20 pages.
Wang et al., "SuperGlue: A Stickier Benchmark for General-Purpose Language Understanding Systems," Advances in Neural Information Processing Systems, 2019, 15 pages.
Xue et al., "mT5: A massively multilingual pre-trained text-to-text transformer," arXiv:2010.11934v2, Oct. 23, 2020, 13 pages.

\* cited by examiner

NEURAL NETWORKS WITH SWITCH LAYERS

CROSS-REFERENCE TO RELATED APPLICATIONS

This application is a continuation of and claims priority to PCT Application No. PCT/US2022/011707, filed on Jan. 7, 2022, which claims priority to U.S. Provisional Application No. 63/134,912, filed on Jan. 7, 2021. The disclosures of the prior applications are considered part of and are incorporated by reference in the disclosure of this application

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input using a neural network that includes multiple neural network layers, at least one of which is a switch neural network layer. A switch neural network layer increases the number of parameters of the neural network without a corresponding increase in per-input computational cost, e.g., in terms of FLOPS.

Particular embodiments of the subject matter described in this specification can be implemented so as to realize one or more of the following advantages.

The techniques described in this specification allow the computational capacity of a neural network, e.g., an attention neural network having a Transformer-based architecture, to be increased without a corresponding increase in the amount of computational resources consumed when using the neural network to perform inference. In other words, the described techniques increase the parameter count while keeping the floating point operations (FLOPS) per example of a neural network constant, both during inference and training, resulting in improved performance on any of a variety of machine learning tasks.

In particular, the described techniques incorporate switch layers, which always select only a single expert from a set of expert neural networks for any given switch layer input. Relative to other approaches that select multiple experts for all or some layer inputs, the described techniques reduce the amount of router computation as each input is only routed to a single expert.

Moreover, the described techniques allow the batch size (expert capacity) of each expert to be reduced since each switch input is only routed to one expert and therefore the fraction of switch inputs that are routed to any given expert can be much more accurately estimated and allow the routing implementation to be greatly simplified and communication costs to be reduced when experts are distributed among multiple different hardware devices, e.g., CPUs, GPUs, TPUs, or any other special-purpose or general purpose computer hardware device (e.g., when each expert neural network in a switch layer is executed on a different one of a plurality of hardware devices). These improvements allow the resulting neural network to be effectively parallelized across multiple devices during training, during inference, or both as described in this specification, resulting in the neural network being able to be effectively and efficiently trained despite having significantly more parameters than existing neural networks. For example, by executing each expert neural network in a switch layer on a different one of a plurality of hardware devices, the parameters of the model increase with the number of devices, while maintaining a manageable memory and computational footprint on each device. Each hardware device includes a central processing unit (CPU), a Tensor Processing Unit (TPUs), or a graphics processing unit (GPU). In some implementations, each hardware device includes a neural network accelerator (e.g., TPU or GPU).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs a machine learning task on a network input to generate network output for the machine learning task.

The machine learning task can be any machine learning task that (i) operates on a network input that is an input sequence, (ii) generates a network output that is an output sequence, or (iii) both.

Some examples of machine learning tasks that the system can be configured to perform follow.

As one example, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs.

In this example, the source language text may be augmented with an identifier that indicates the target language into which the neural network should translate the source language text.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task for generating an image in accordance with a distribution of a set of training images, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

To perform the machine learning task, the system includes a neural network that includes multiple layers, at least one of which is a switch layer.

As a particular example, the neural network can be an attention neural network that includes multiple attention layers. Each layer operates on a respective input sequence that includes a respective layer input at each of one or more positions.

Moreover, each of the layers includes an attention sub-layer and a feed-forward sub-layer. The attention sub-layer receives the input sequence for the layer and applies an attention mechanism on the input sequence for the layer to generate an attended input sequence. The attention mechanism applied by the attention layer depends on the configuration of the attention neural network, as will be described in more detail below. The feed-forward sub-layer then operates on the attended input sequence to generate an output sequence for the layer.

Generally, the layers within the attention neural network can be arranged in any of a variety of configurations.

As one example, when the network input is an input sequence, the attention neural network can include an encoder neural network that includes a subset of the plurality of layers and that encodes the input sequence to generate a respective encoded representation of each input in the sequence. In this example, the attention mechanism applied by the layers in the encoder is a self-attention mechanism, e.g., a multi-head self-attention mechanism.

As another example, the attention neural network can include a decoder neural network that includes a different subset of the plurality of layers and that processes either the network input or, when the attention neural network also includes the encoder neural network, the encoded representation of the network input to generate the network output. In some of these examples, when the network output is an output sequence, the decoder neural network operates autoregressively and the attention sub-layers within some or all of the layers of the decoder apply masked self-attention over the partially generated output sequence. When the neural network includes both an encoder and a decoder, some of the layers in the decoder apply cross-attention into the encoded representations while others apply self-attention over the output sequence, either masked or not masked. When the attention neural network includes a decoder neural network that operates directly on the input sequence, the attention layers within the decoder can apply a self-attention mechanism over the input sequence.

The specifics of the operation of the attention layers within the decoder neural network and the encoder neural network are described in more detail in Vaswani, et al, attention Is All You Need, arXiv:1706.03762, and Raffel, et al, Exploring the Limits of Transfer Learning with a Unified Text-to-Text Transformer, arXiv:1910.10683, and Devlin et al, *BERT: Pre-training of Deep Bidirectional Transformers for Language Understanding*, arXiv:1810.04805, the entire contents of which are hereby incorporated by reference herein in their entirety.

Figure 1:
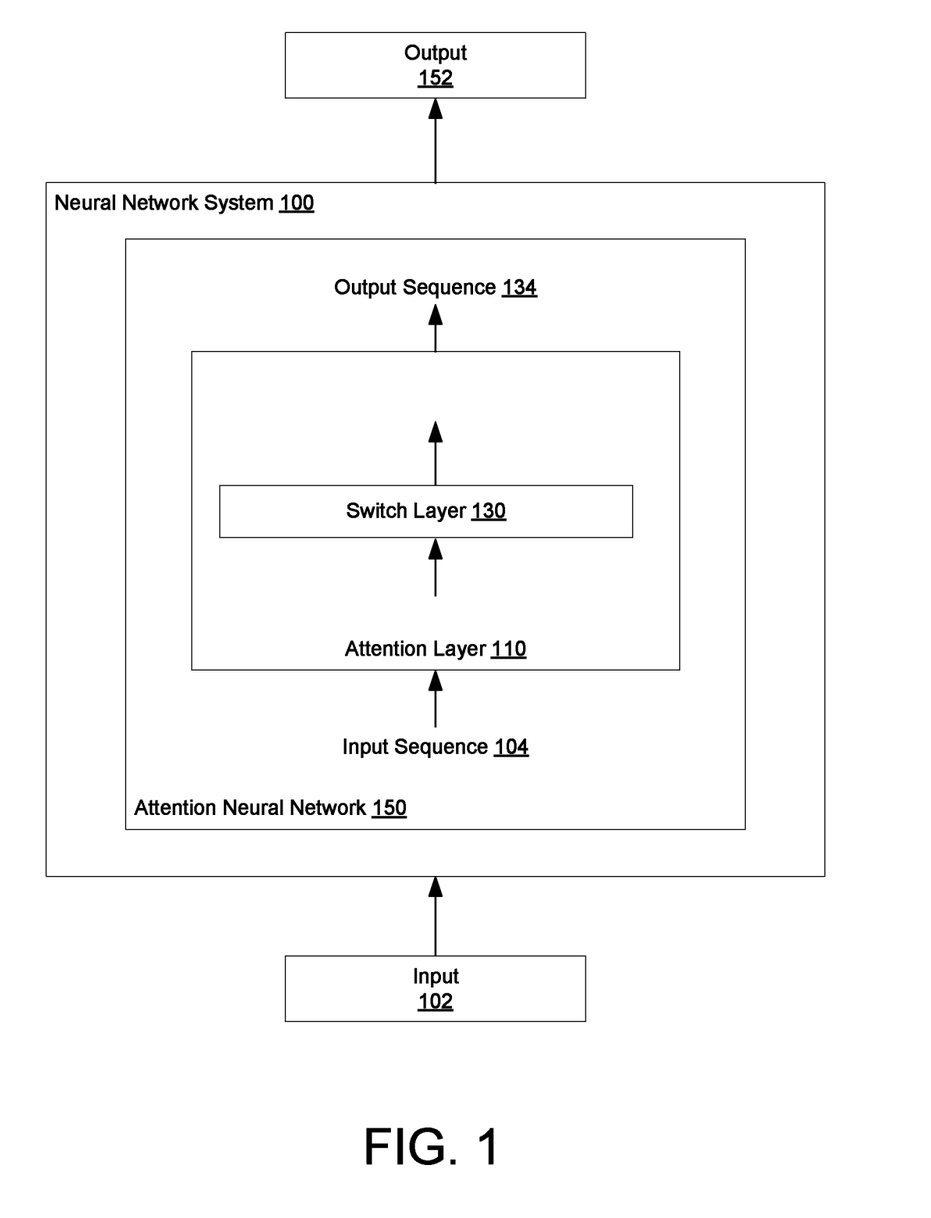
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 can receive an input 102 and perform a machine learning task on the input 102 to generate an output 152.

As described above, the neural network system 100 can perform any of a variety of tasks that involve (i) operating on an input 102 that is an input sequence, (ii) generating an output 152 that is an output sequence, or (iii) both.

The neural network system 100 includes an attention neural network 150 that includes multiple attention layers 110.

Each attention layer 110 operates on an input sequence 104 and generates a corresponding output sequence 134.

Although one attention layer is depicted in FIG. 1 for convenience, as described above, the attention neural network 150 generally includes many other layers, including, for example, embedding layers, output layer(s), and other attention layers.

Specifically, the input sequence 104 has a respective input at each of a plurality of input positions in an input order and the output sequence 134 has a respective output at each of the positions in the input order. That is, the attention layer generates a respective output for each input position in the input sequence 104.

In general, the input sequence 104 can be any intermediate sequential data generated by the attention neural network 150 when performing the machine learning task on the input 102. For example, the input sequence 104 can be embedded (i.e., numeric) representations of the system input 102 generated by an embedding layer, optionally modified by adding or element-wise multiplying each embedding by a positional embedding. As another example, the input sequence 104 can be an output sequence generated by a preceding attention layer or other layer in the attention neural network 150. As another example, when the neural network 150 generates the network output auto-regressively, the input sequence 140 can be embedded representations of the currently generated network output as of the current time step, optionally modified by adding or element-wise multiplying each embedding by a positional embedding.

To generate the output sequence 134 from the input sequence 104, each attention layer 110 includes an attention sub-layer and a feed-forward sub-layer. Optionally, each attention layer can also include an addition+normalization operation after the attention sub-layer, after the feed-forward sub-layer, or both.

The attention sub-layer receives the input sequence 104 for the layer 110 and applies an attention mechanism on the input sequence for the layer to generate an attended input sequence 124.

Generally, to apply the attention mechanism, the sub-layer 120 uses one or more attention heads. Each attention head generates a set of queries, a set of keys, and a set of values, and then applies any of a variety of variants of query-key-value (QKV) attention using the queries, keys, and values to generate an output. In some cases, the keys and values are the same, i.e., generated by applying a shared transformation to the same inputs, while, in other cases, the keys and values are different, i.e., are generated by applying different transformations to the same inputs, different transformations to different inputs, or the same transformation to different inputs. When there are multiple attention heads, the sub-layer 120 then combines the outputs of the multiple attention heads, e.g., by concatenating the outputs and, optionally, processing the concatenated outputs through a linear layer. Examples of QKV attention variants are described in Vaswani, et al, *Attention Is All You Need*, arXiv:1706.03762, Raffel, et al, *Exploring the Limits of Transfer Learning with a Unified Text-to-Text Transformer*, arXiv:1910.10683, Devlin et al, *BERT: Pre-training of Deep Bidirectional Transformers for Language Understanding*, arXiv:1810.04805, Dai, et al, *Transformer XL: Attentive Language Models Beyond a Fixed-Length Context*, arXiv:1901.02860, and Kitaev, et al, *Reformer: The Efficient Transformer*, arXiv:2001.04451, the entire contents of which are hereby incorporated by reference herein in their entirety.

Generally, as described above, the layers within the attention neural network can be arranged in any of a variety of configurations and the attention mechanism applied by the attention sub-layer 120 depends on the configuration of the attention neural network 150.

As one example, when the network input is an input sequence, the attention neural network 150 includes an encoder neural network that includes a subset of the plurality of layers and that encodes the input sequence to generate a respective encoded representation of each input in the sequence. In this example, the attention mechanism applied by the attention sub-layers 120 in the encoder is a self-attention mechanism, e.g., a multi-head self-attention mechanism, where the queries, keys, and values are all generated from the input sequence to the attention sub-layer.

As another example, the attention neural network 150 includes a decoder neural network that includes a different subset of the plurality of layers and that processes either the network input or the encoded representation of the network input to generate the network output. In some of these examples, when the network output is an output sequence, the decoder neural network operates auto-regressively and the attention sub-layers 120 within some or all of the layers of the decoder apply masked self-attention over the partially generated output sequence, where the queries, keys, and values are all generated from the input sequence to the attention sub-layer 120.

When the neural network 150 includes both an encoder and a decoder, some of the layers in the decoder apply cross-attention into the encoded representations while others apply self-attention over the output sequence, either masked or not masked. In cross-attention, the queries are generated from the input sequence to the attention sub-layer 120 while the keys and values are generated from the encoded representations of the network input.

When the attention neural network 150 includes a decoder neural network that operates directly on the input sequence, the attention sub-layers 120 within the decoder can apply a self-attention mechanism over the input sequence.

As used in this specification, the term "learned" means that an operation or a value has been adjusted during the training of the attention neural network 150.

In some cases, the attended input sequence 124 is the final output of the attention mechanism. In some other cases, the sub-layer 120 applies an addition+normalization operation that applies a residual connection and layer normalization or another type of normalization to the output of the attention mechanism to generate the attended input sequence.

The feed-forward sub-layer then operates on the attended input sequence to generate an output sequence 134 for the layer 110.

The feed-forward sub-layer is configured to operate on each position in the attended input sequence separately, i.e., in a position-wise manner. In particular, for each input position, the feed-forward sub-layer is configured receive an attended layer input at the input position and apply a set of transformations to the attended layer input at the input position to generate an output for the input position. The transformations applied by the sub-layer will generally be the same for each input position (but different feed-forward sub-layers in the attention neural network will apply different transformations).

More specifically, the feed-forward sub-layer includes a feed forward neural network that operates on each position in the attended input sequence separately, i.e., in a position-wise manner. The FFN can be, e.g., a multi-layer, e.g., two layer or three layer, neural network of fully-connected layers with, e.g., a ReLU or GeLU activation function.

In particular, for each input position, the feed-forward sub-layer is configured receive an attended layer input at the input position and to process the attended layer input using the FFN to generate an initial output for the input position.

Thus, the feed-forward sub-layer processes each attended layer input using the same FFN.

Optionally, the attention layer 110 can then then apply an addition+normalization operation to the initial outputs to generate the output sequence 134 for the attention layer 110.

Generally, some or all of the attention layers 110 within the attention neural network include a switch layer 130. For example, every attention layer 110 can include a switch layer 130, every other attention layer 110 within the attention neural network can include a switch layer 130, or every third attention layer 110 within the attention neural network can include a switch layer 130.

A switch layer 130 is a layer that includes a learned routing function and a plurality of expert neural networks.

For each input that is processed by the switch layer 130, the switch layer 130 selects, using the learned routing function, a single expert neural network from the plurality of expert neural networks in the layer. That is, even though the switch layer 130 includes multiple experts, only a single expert is selected for processing any given switch input.

Thus, while which expert is selected as the single expert can change for different inputs to the switch layer, only a single expert is selected for any given input. That is, unlike other systems that employ conditional computation, the switch neural network layer requires that only a single expert is selected for all received inputs rather than potentially selecting multiple experts for a given input. This significantly increases the number of parameters and, therefore, the computational capacity of the neural network 150 without increasing the number of FLOPS that are required to perform inference after training or a forward pass through the neural network during training.

The switch layer 130 then process the layer input using only the selected expert neural network to generate an initial switch layer output for the layer input and generates a final switch layer output for the switch layer by computing a product of the routing score for the selected expert neural network and the initial switch layer output generated by the selected expert neural network.

The operations performed by a switch layer 130 to generate a switch layer output for a given input are described in more detail below with reference to FIG. 2.

The switch layer 130 can be included in various configurations within a given attention layer 110.

As a particular example, the switch layer 130 can be used to generate the queries, keys, and values for one of the attention heads of the attention sub-layer. The operation of an attention layer in this configuration is described in more detail below with reference to FIG. 3B.

As another particular example, the switch layer 130 can be used in place of the feed-forward sub-layer of the attention sub-layer. The operation of an attention layer in this configuration is described in more detail below with reference to FIG. 3A.

Prior to using the neural network 150 to generate new outputs for the machine learning task, the system 100 or another training system trains the neural network on training data.

Training the neural network is described below with reference to FIG. 4.

In some implementations, during training, during inference after training, or both, the system 100 implements the attention neural network 150 by parallelizing the neural network across multiple hardware devices. For example, the system 100 can implement the attention neural network across multiple hardware accelerators, e.g., Tensor Processing Units (TPUs), graphics processing units (GPUs), or both.

In these implementations, for any given switch layer 130, the system can execute each expert neural network within the switch layer 130 on a different one of the multiple devices. However, doing so can either negatively impact the performance of the neural network (if not enough compute is available on a given device to process all of the inputs assigned to a given expert neural network that executes on the given device) or create significant communication costs and waste memory, compute, or both. The described techniques mitigate these issues, as will be described in more detail below with reference to FIG. 5. That is, switch layers 130 effectively add computational capacity to the neural network while being able to be effectively deployed in a distributed computing setting.

In some implementations, after training the neural network 150, the system 100 can use the neural network 150 to train another, smaller neural network that performs the machine learning task through distillation. The system 100 can then use the smaller neural network for inference. For example, the smaller neural network can be an attention neural network that does not have switch layers.

Figure 2:
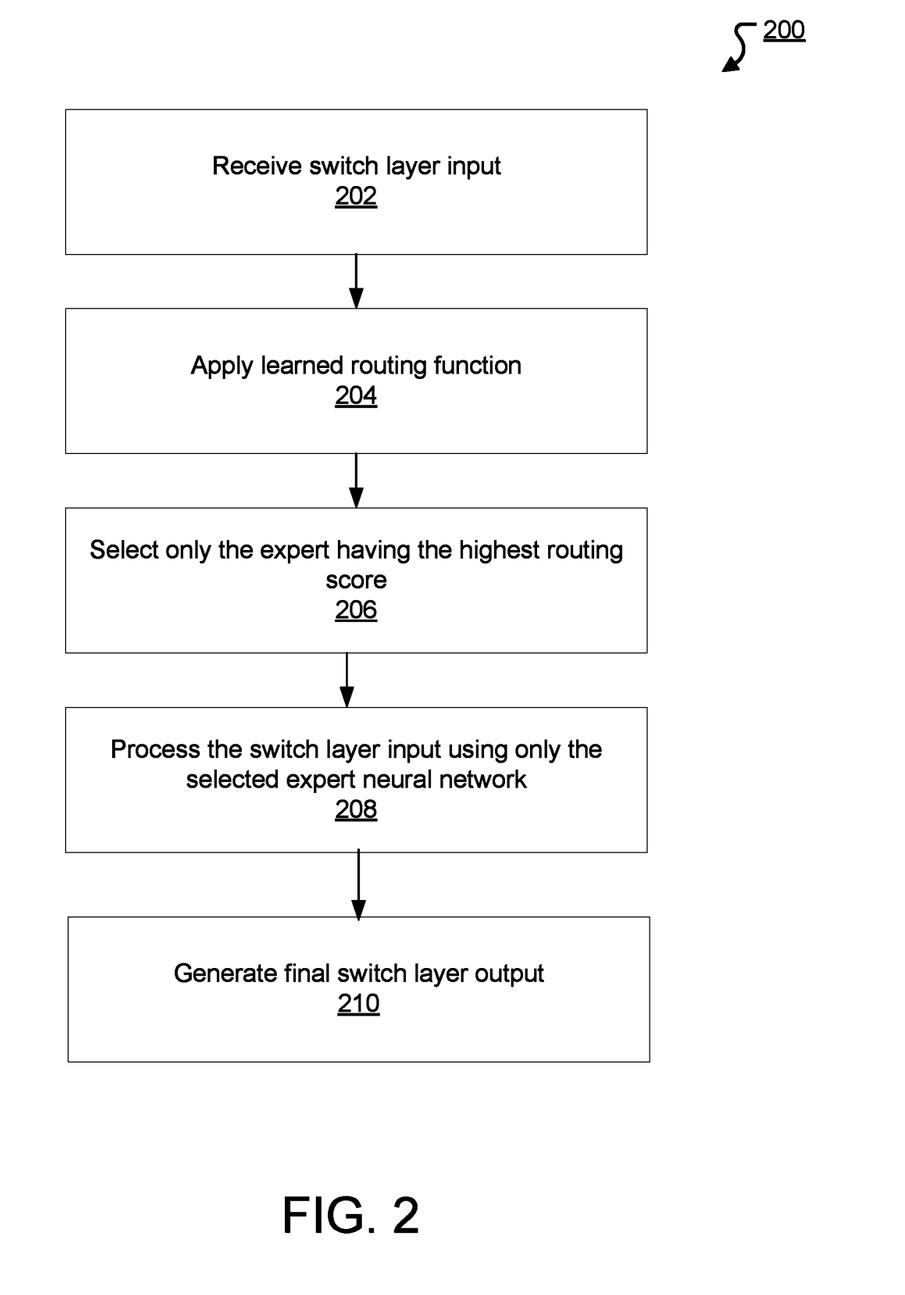
FIG. 2 is a flow diagram of an example process for processing a switch layer input using a switch layer.

FIG. 2 is a flow diagram of an example process 200 for processing a switch layer input using a switch layer. For convenience, the process 200 will be described as being performed by a system of one or more computers located in one or more locations. For example, a neural network system that includes a switch layer, e.g., neural network system 100 of FIG. 1, appropriately programmed in accordance with this specification, can perform the process 200.

The switch layer receives a switch layer input for the switch layer (step 202). Generally, the switch layer input can be one of a sequence of switch layer inputs, i.e., the switch layer can operate independently and in parallel for each switch layer input in the sequence of switch layer inputs. For example, when the switch layer is used to generate queries, keys, and values for an attention mechanism of an attention head, the switch layer input is one of the inputs in a sequence of inputs to the attention head. As another example, when the switch layer is used in place of a feed-forward sub-layer, the switch layer input is one of the inputs in a sequence of inputs to the feed-forward sub-layer, i.e., a sequence of attended layer inputs generated as described above.

The switch layer applies the respective learned routing function in the switch layer to the switch layer input (step 202). The routing function is referred to as "learned"

because the function has parameters ("routing parameters") that are learned during the training of the neural network.

Thus, the switch layer applies the learned routing function in accordance with current values of the routing parameters of the learned routing function to generate a score distribution that includes a respective routing score for each of the plurality of expert neural networks in the switch layer.

As a particular example, the routing function can be configured to apply a matrix of the routing parameters of the respective learned routing function to the switch layer input to generate a respective logit for each of the plurality of expert neural networks in the switch layer.

The routing function can then apply a softmax to an input that includes (i) the respective logits or (ii) noisy logits generated by applying noise to the respective logits to generate the score distribution. As a particular example, after training, the routing function can directly use the logits to compute the score distribution. During training, however, the routing function can first apply, e.g., add or element-wise multiple, a noise vector sampled from a specified noise distribution to the respective logits before applying the softmax. Applying noise during training can ensure that system explores the space of possible routings during training instead of converging to a local optimum routing.

As described above, each switch layer also has a plurality of expert neural networks. Each expert neural network is a neural network having parameters ("expert parameters") that are also learned during the training of the neural network. Each expert neural network generally has the same architecture, but, because of the training of the neural network, has different parameter values. For example, each expert can be, e.g., a multi-layer, e.g., two layer or three layer, neural network of fully-connected layers with, e.g., a ReLU or GeLU activation function.

The switch layer selects, from the plurality of expert neural networks, only the expert neural network having the highest routing score (step 204), i.e., and not any of the other expert neural networks. That is, the system makes a sparse selection of the experts, because only one expert of the multiple experts is selected for any given switch layer input.

The switch layer processes the switch layer input using only the selected expert neural network and in accordance with current values of the expert parameters of the selected expert neural network to generate an initial switch layer output for the layer input (step 206).

For example, when the switch layer replaces a feed-forward neural network, the initial switch layer output can be a vector having the same dimensionality as the switch layer input. When the switch layer is used to generate queries, keys, and values, the initial switch layer output can be a query vector, a key vector, and a value vector for the switch layer input.

The system then generates a final switch layer output for the switch layer using the routing score for the selected expert neural network and the initial switch layer output generated by the selected expert neural network (step 208). For example, the system can compute a product of the routing score and the initial switch layer output.

Figure 3A:
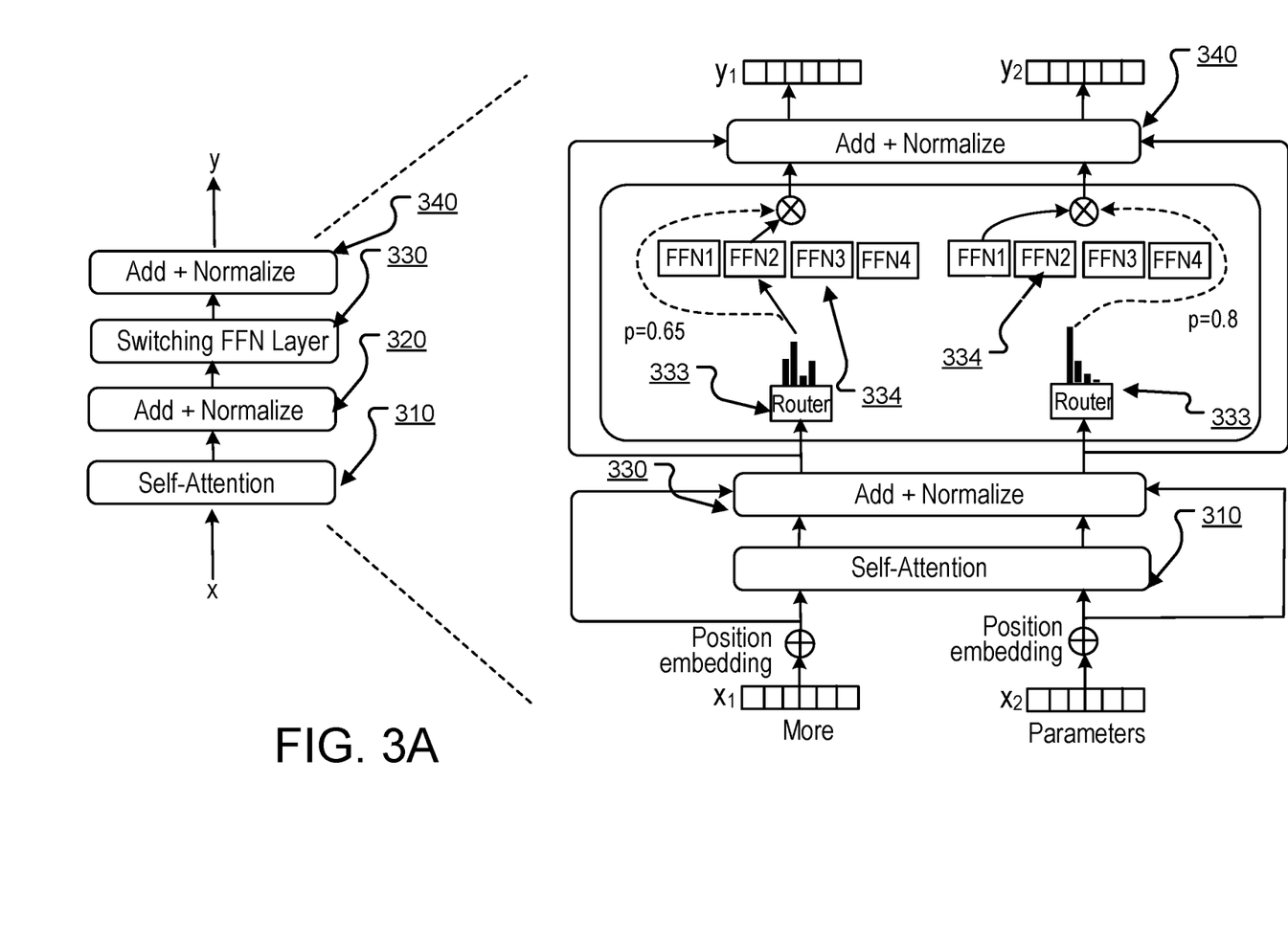
FIG. 3A shows an example of an attention neural network layer that includes a switch layer in place of a feed-forward sub-layer.

FIG. 3A shows an example of an attention neural network layer that includes a switch layer 330 ("switching FFN layer") in place of a feed-forward sub-layer as described above.

As described above, the layer includes an attention sub-layer 310 that applies an attention mechanism (in the example of FIG. 3A, self-attention) to an input sequence for the layer and then an "add & norm" operation 320 to generate an attended input sequence. The "add & norm" operation 330 includes a residual connection followed by a layer normalization operation.

The attention layer processes the attended input sequence to generate an output sequence for the attention layer that includes a respective output for each attended layer input in the attended input sequence. Switch layer inputs that are provided as input to a given switch layer will also be referred to in this specification as "tokens."

The switch layer 330 is configured to operate on each position in the attended input sequence separately, i.e., in a position-wise manner. In particular, for each input position, the switch layer 330 is configured receive an attended layer input at the input position and apply a set of transformations to the attended layer input at the input position to generate an output for the input position. Generally, the switch layer 330 can perform the processing for each switch layer input within a given input sequence or within a given batch of inputs to the neural network in parallel because the computation for one switch layer input is independent of the computation for any other switch layer input.

The attention layer then applies an "add&norm" operation 340 to the initial outputs to generate the output sequence for the attention layer.

More specifically, FIG. 3A shows the operation of the switch layer 330 for two tokens at two positions in the attended input sequence (one token x1 corresponding to the word "more" and the other token x3 corresponding to the word "parameters"). Because the example attention layer is the first attention layer in the neural network, the attention layer first applies a positional embedding to each token before processing the tokens using the attention sub-layer 310 and the add and norm operation 330. In practice, however, if the attention layer is not the first attention layer in the network, the attention layer can directly process the input sequence to the layer without applying the positional embeddings.

The switch layer 330 includes a routing function 333 and four expert neural networks 334. Each expert neural network 334 can be a feed forward neural network (FFN), e.g., a multi-layer, e.g., two layer or three layer, neural network of fully-connected layers with, e.g., a ReLU or GeLU activation function.

For the first token, the switch layer 330 applies the routing function 333 to the first token to generate a set of scores for the experts, with the highest score being a score of 0.65 for the second expert ("FFN3"). Based on this, the switch layer 330 processes the second token using only FFN3 to generate an expert output for FFN3 and then generates a final output for the first token by computing a product of the score for FFN3 (0.65) and the expert output generated by FFN3.

For the second token, the switch layer 330 applies the routing function 333 to the second token to generate a set of scores for the experts, with the highest score being a score of 0.8 for the first expert ("FFN1"). Based on this, the switch layer 330 processes the second token using only FFN1 to generate an expert output for FFN1 and then generates a final output for the first token by computing a product of the score for FFN1 (0.8) and the expert output generated by FFN1.

Thus, the switch layer 230 selected different experts for the tokens, but selected only a single expert for each token (rather than selecting multiple experts for one or both of the two tokens).

Figure 3B:
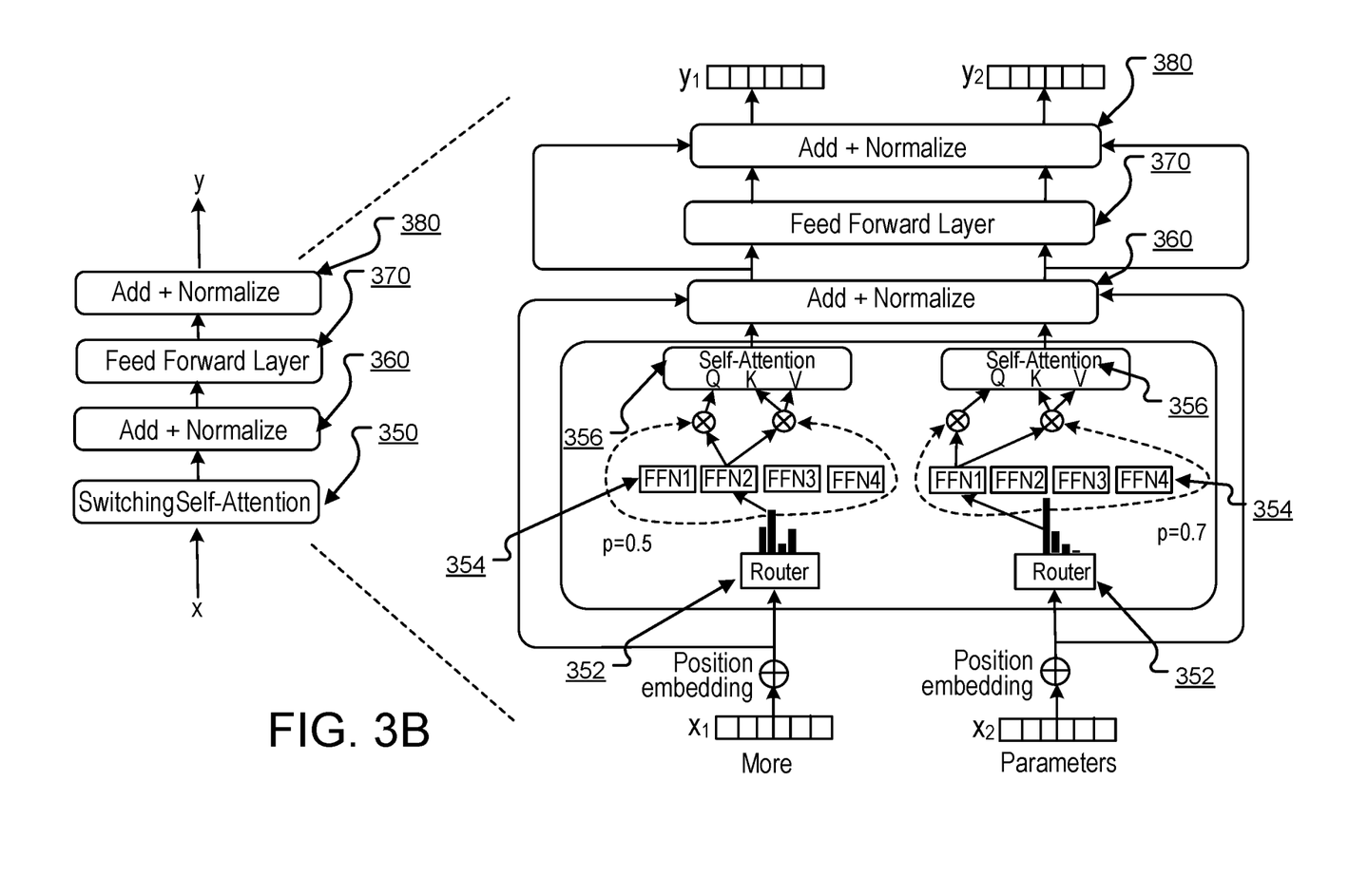
FIG. 3B shows an example of an attention neural network layer that includes a switch layer within an attention sub-layer.

FIG. 3B shows an example of an attention neural network layer that includes a switch layer within an attention sub-layer 350 ("switching self-attention layer") as described above.

As described above, the attention sub-layer 350 that applies an attention mechanism (in the example of FIG. 2, self-attention) to an input sequence for the layer and then an "add & norm" operation 360 to generate an attended input sequence. The "add & norm" operation 360 includes a residual connection followed by a layer normalization operation.

The attention layer also includes a feed forward sub-layer 370 that processes the attended input sequence to generate a respective initial output for each attended input in the attended input sequence.

The attention layer then applies an "add&norm" operation 380 to the initial outputs to generate the output sequence for the attention layer.

Within the attention sub-layer 350, the switch layer is configured to operate on each position in the input sequence separately, i.e., in a position-wise manner. In particular, for each input position, the switch layer is configured receive the layer input at the input position and apply a set of transformations to the layer input at the input position to generate the query vector, key vector, and value vector for the input position. Generally, the switch layer can perform the processing for each switch layer input within a given input sequence or within a given batch of inputs to the neural network in parallel because the computation for one switch layer input is independent of the computation for any other switch layer input.

More specifically, FIG. 3B shows the operation of the switch layer for two tokens at two positions in the attended input sequence (one token x1 corresponding to the word "more" and the other token x2 corresponding to the word "parameters"). Because the example attention layer is the first attention layer in the neural network, the attention layer first applies a positional embedding to each token before processing the tokens using the attention sub-layer 350. In practice, however, if the attention layer is not the first attention layer in the network, the attention layer can directly process the input sequence to the layer without applying the positional embeddings.

The switch layer includes a routing function 352 and four expert neural networks 354. Each expert neural network 354 can be a feed forward neural network (FFN), e.g., a multi-layer, e.g., two layer or three layer, neural network of fully-connected layers with, e.g., a ReLU or GeLU activation function.

For the first token, the switch layer applies the routing function 352 to the first token to generate a set of scores for the experts, with the highest score being a score of 0.5 for the second expert ("FFN2"). Based on this, the switch layer processes the second token using only FFN2 to generate an expert output for FFN2 and then generates a final output for the first token by computing a product of the score for FFN2 (0.5) and the expert output generated by FFN2, i.e., the initial query, key, and value vector generated by FFN2.

For the second token, the switch layer applies the routing function 352 to the second token to generate a set of scores for the experts, with the highest score being a score of 0.7 for the first expert ("FFN1"). Based on this, the switch layer processes the second token using only FFN1 to generate an expert output for FFN1 and then generates a final output for the first token by computing a product of the score for FFN1 (0.7) and the expert output generated by FFN1, i.e., the initial query, key, and value vector generated by FFN1.

Thus, the switch layer selected different experts for the tokens, but selected only a single expert for each token (rather than selecting multiple experts for one or both of the two tokens).

Once the switch layer has generated the queries, keys, and values for all of the inputs in the input sequence, the attention sub-layer 350 applies an attention mechanism 356 (self-attention or a different type of attention) using the queries, keys, and values to generate a respective output for each input in the input sequence.

While only a single switch layer and a single attention mechanism is depicted in FIG. 3B, in cases where the attention layer applies multi-head attention, each attention head (or, equivalently, each attention mechanism) will have a respective switch layer.

Figure 4:
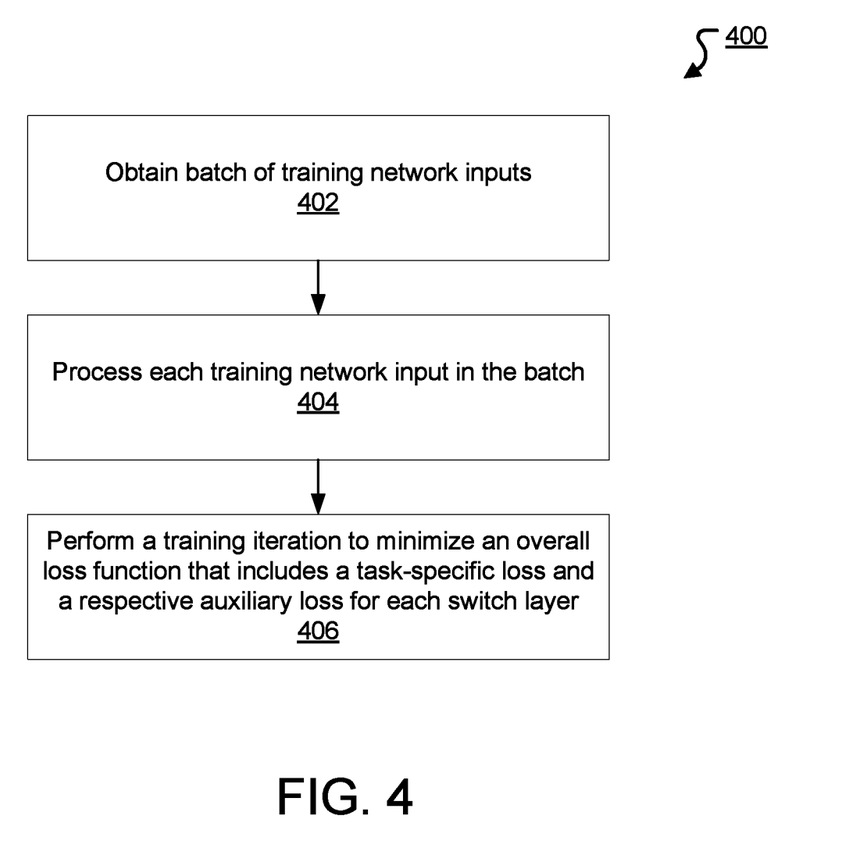
FIG. 4 is a flow diagram of an example process for training a neural network that includes switch layers.

FIG. 4 is a flow diagram of an example process 400 for training a neural network that includes switch layers. For convenience, the process 400 will be described as being performed by a system of one or more computers located in one or more locations. For example, a neural network system, e.g., the neural network system 100 of FIG. 1, appropriately programmed in accordance with this specification, can perform the process 400.

The system obtains a batch of training network inputs and, for each training network input, a respective target network output (step 402).

The system processes each training network input in the batch using the neural network to generate a respective network output for each training network input (step 404). That is, the system processes each training network input using the switch layers and the other layers in the neural network as described above with reference to FIGS. 1, 2, 3A, and 3B.

The system performs a training iteration to minimize an overall loss function (step 406).

That is, the system computes, through backpropagation, a gradient of the overall loss function with respect to the parameters of the neural network and then uses an optimizer, e.g., Adam, rmsProp, Adafactor, or a learned optimizer, to update the values of the parameters of the neural network, i.e., the parameters of the non-switch layers in the neural network, the parameters of the routing functions of the switch layers, and, for each switch layer, the parameters of any expert that was selected for at least one token during the processing of the training network inputs in the batch.

The overall loss function includes a task-specific loss that measures, for each training network input in the batch, an error between the respective network output for the training network input and the respective target network output for each network input. The task-specific loss can be any appropriate loss function for the machine learning task that the system is configured to perform. Examples of task-specific losses include cross entropy losses, negative log likelihood losses, and so on.

The overall loss function also include a respective auxiliary loss for each switch layer. The auxiliary loss for a given switch layer penalizes the switch layer for a) not assigning switch layer inputs received by the switch layer during the processing of the batch of training network inputs equally among the expert neural networks in the switch layer and b) not generating uniform score distributions for switch layer inputs received by the switch layer during the processing of the batch of training network inputs.

In other words, the auxiliary loss is minimized when each expert is selected for the same number of switch layer inputs during the processing of a given batch of training examples.

More specifically, the respective auxiliary loss for each switch layer is based on a dot product of (i) a first vector that includes, for each expert neural network in the switch layer, a respective value that measures a fraction of the switch layer inputs received by the switch layer during the processing of the batch of training network inputs that were routed to the expert neural network and (ii) a second vector that includes, for each expert neural network in the switch layer, a respective value that measures an average routing score generated by the routing function of the switch layer for the expert neural network for switch layer inputs received by the switch layer during the processing of the batch of training network inputs.

As a specific example, the auxiliary loss for a given switch layer can be equal to:

$$\text{loss} = \alpha N \Sigma_{i=1}^{N} f_i \cdot P_i,$$

where $\alpha$ is the weight for the auxiliary loss in the overall loss function, N is the total number of experts in the given switch layer, $f_i$ is the entry of the first vector corresponding to expert i and is equal to the fraction of the switch layer inputs received by the switch layer during the processing of the batch of training network inputs that were routed to the i-th expert neural network:

$$f_i = \frac{1}{T} \sum_{x \in B} l\{\text{argmax } p(x), i\},$$

T is the total number of switch layer inputs x processed by the switch layer during the processing of the batch B, and l{argmax p(x),i} is equal to one if the expert i has the highest routing score p and zero otherwise, and $P_i$ is the entry of the second vector corresponding to expert i and is equal to the average routing score generated by the routing function of the switch layer for the expert neural network i for switch layer inputs received by the switch layer during the processing of the batch of training network inputs:

$$P_i = \frac{1}{T} \sum_{x \in B} p_i(x),$$

where $p_i(x)$ is the routing score for expert i for switch layer input x.

More specifically, the fraction of switch layer inputs routed to any given expert is derived from a non-differentiable operation, i.e., the hard selection of the single expert for each switch layer input, and therefore cannot be directly measured by the loss term. However, because the average routing score is a differentiable computation, the gradient of this term can be directly computed with respect to the parameters of the routing function and can therefore be used during training of the neural network.

During training, the training system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the attention neural network in parallel. Moreover, the system can first pre-train the neural network on a large unsupervised data set through unsupervised learning, e.g., to minimize a BERT loss or other unsupervised loss, and then fine-tune the neural network on task-specific training data to optimize the loss function for the task.

Some specific examples of optimization techniques that can improve the performance of the training process are described next.

In particular, the use of sparse experts, i.e., where only one of multiple experts is selected for each switch layer input, may introduce training difficulties over the training of a conventional attention neural network. The system can employ one or more techniques to overcome these issues and effectively train the neural network.

As one example, using low precision number formats, e.g., bfloat16 formats, can exacerbate issues in the softmax computation for the routing functions. This issue can be mitigated by using a higher precision number format, e.g., float32. However, using higher precision number formats can incur a significant additional communication cost within a given switch layer when the switch layer is distributed across multiple devices as described above.

The system can compensate for the instability without introducing additional communication costs by selectively casting to higher precision within localized parts of the model, i.e., parts that are executed on the same device.

For example, the system can convert the input to the softmax of the routing function from a second computer number format, e.g., bfloat16, to a first computer number format, e.g., float32, and then use the first computer number format to compute the routing scores for the experts. The system can then convert the routing score for the selected expert neural network to the second computer number format prior to computing the product of the routing score and the initial switch layer output, which is computed in the second computer number format. Thus, the system avoids instability in the softmax computation while avoiding sending numbers in the first computer number format across devices.

As another particular example, the system can perform at least some operations for computing the respective auxiliary loss for the switch layer using the first computer number format, e.g., computing the first vector, the second vector, or both, that occupies a first number of bits in memory, e.g., float32, and operations of the expert neural networks are performed using a second computer number format that occupies a second, smaller number of bits in memory, e.g., bfloat16.

As another example of a training difficulty, instability within the training process can result because of the hard-switching (routing) decisions at each of the switch layers. To assist in ensuring that the training remains stable, the system can initialize the values of the parameters of the neural network using a technique that assists in maintaining the stability of the training process. As a particular example, the system can initialize the values of the parameters of the neural network by, for each parameter, drawing an element from a truncated Normal distribution with a standard deviation equal to a square root of a ratio between (i) a scale-hyperparameter and (ii) a number of input units in a weight tensor to which the parameter belongs, wherein the scale-hyperparameter is equal to a value between zero and 0.5. For example, the scale-hyperparameter can be set equal to 0.1. Using a relatively smaller scale-hyperparameter can improve the quality of the trained model and also reduce the likelihood that the training becomes unstable, i.e., has parameter updates with exceedingly high variance.

As described above, in some cases, the neural network can be trained to perform an initial task and then fine-tuned on training data for the machine learning task. In some cases, the amount of training data for the machine learning task may be much smaller than the amount of training data available for the initial task. This can cause the neural network to over-fit during the fine-tuning. This potential issue can be exacerbated for the described neural networks, since the neural network with switch layers has more parameters than an equivalent neural network but without switch layers. To address this, the system can regularize the training of the neural network during fine-tuning, i.e., during training for the machine learning task using dropout.

More specifically, during fine-tuning, the system can apply dropout to some or all of the nodes within expert neural networks in the one or more switch layers with a first dropout rate while applying dropout to nodes in layers of the neural network other than the switch layers with a second, lower dropout rate. That is, the system applies a higher dropout rate within the expert neural networks than outside the switch layers. For example, the second dropout rate can be less than or equal to 0.1 while the first dropout rate is greater than 0.1, e.g., 0.4. Having a higher dropout rate within the experts can effectively regularize the training without a corresponding performance loss after training.

As described above, in some implementations, during training, during inference after training, or both, the system implements the attention neural network by parallelizing the neural network across multiple hardware devices. For example, the system can implement the attention neural network across multiple hardware accelerators, e.g., Tensor Processing Units (TPUs), graphics processing units (GPUs), or both.

In this case, for any given switch layer, the system can execute each expert in the layer on a different one of the multiple hardware devices. Each expert may have its own unique set of parameters (e.g., weights). The routing function can either be executed on the same device as one of the experts or on a separate device from all of the experts.

To execute an expert layer on a given device, the system allocates a certain batch size for the expert. That is, during the processing of each batch of training inputs or inputs at inference, the system requires that the expert process a batch of a fixed size of switch layer inputs. This can be because of requirements of the device, i.e., the hardware of the device is configured to only process fixed size batches. For example, certain ASICs, e.g., TPUs, may require that the batch size for a neural network be fixed before the neural network is deployed onto the ASIC. This can also be to ensure that sufficient memory and compute is always available on the device during the processing of any given batch of inputs to the neural network. For example, if the device is also executing other processes, the system can fix the batch size prior to deploying the expert neural network so that a sufficient amount of memory and processor cycles are always available for processing inputs using the network instead of being allocated to the other processes.

Therefore, if more switch inputs than the batch size for a given expert are routed to the expert, the system cannot process the excess switch inputs using the given expert and instead has to set the output of the expert for those switch inputs to zero. Because of the residual connection that is applied after the output is generated, the system effectively "skips" the computation of the expert feed-forward neural networks for that switch input. Skipping the computation results in a loss of performance because the representation of the switch input is not enhanced by processing through the expert neural networks.

If fewer switch inputs than the batch size for a given expert are routed to the expert, memory and computation are wasted, e.g., because the hardware device processes a dummy input unnecessarily due to the fixed batch size or because memory that was allocated to the expert on the device could have been allocated to another process.

The system can take these factors into account when determining the batch size. For example, the system can determine the batch size allocated to each expert in a given switch layer using the following ratio:

$$\left(\frac{\text{switch layer inputs in the batch}}{\text{number of experts in the switch layer}}\right) \times \text{capacity factor,}$$

where the capacity factor accounts for uneven distributions of switch layer inputs among the plurality of expert neural networks in the switch layer, i.e., specifies how much "buffer" is allocated on each device when switch layer inputs are not perfectly balanced across devices.

Figure 5:
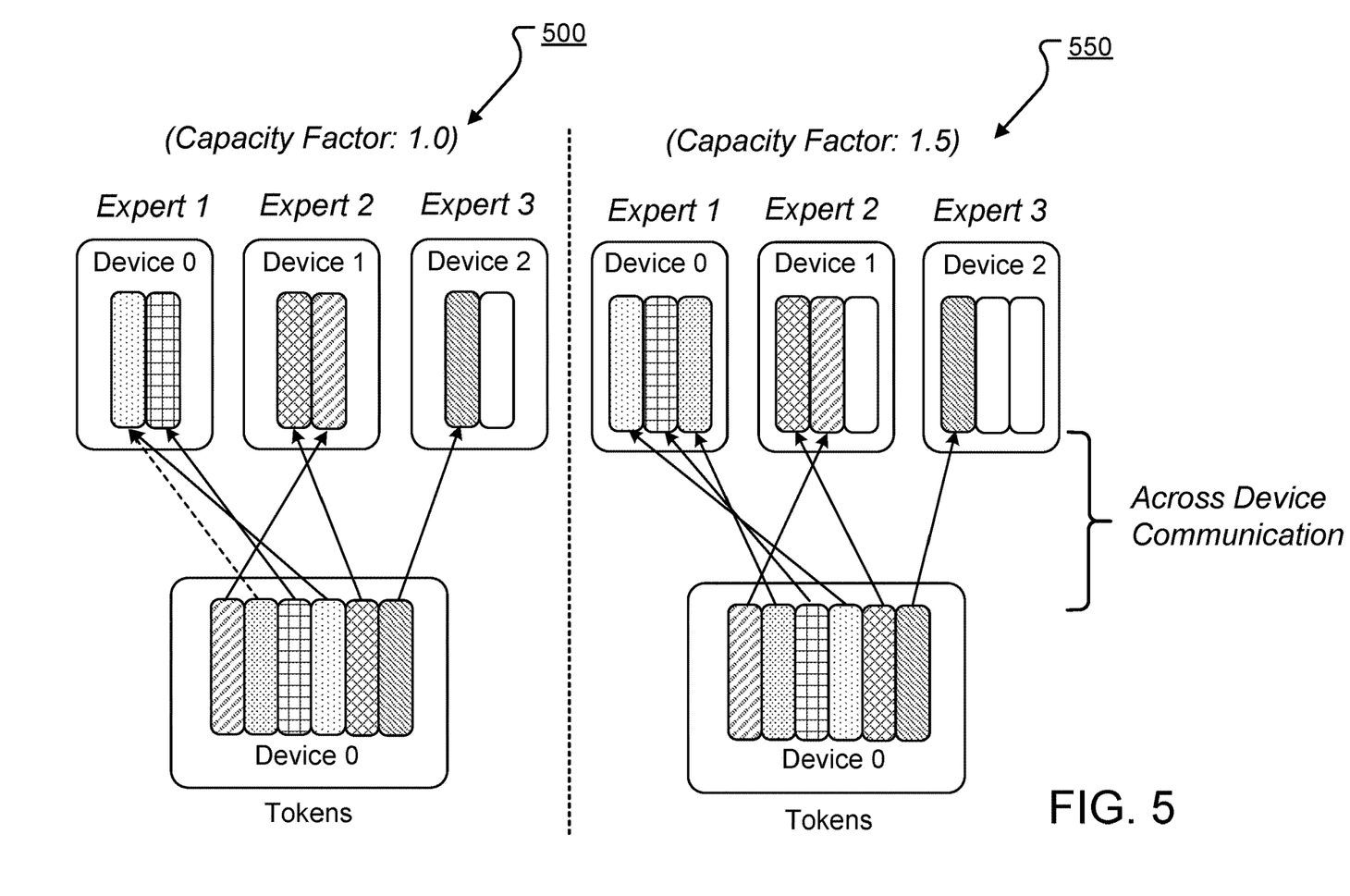
FIG. 5 shows an example of routing switch layer inputs ("tokens") for an example switch layer.

FIG. 5 shows an example of routing switch layer inputs ("tokens") for an example switch layer. In the example of FIG. 5, the switch layer includes three experts (expert 1, expert 2, and expert 3) and is distributed across three devices (device 0, device 1, and device 2). That is, the routing function and expert 1 execute on device 0, expert 2 executes on device 1, and expert 3 executed on device 3.

More specifically, FIG. 5 shows an example routing 500 when the capacity factor is set to 1.0 and an example routing 550 when the capacity factor is set to 1.5

In both example routing 500 and example routing 550, there are six tokens to be routed.

In the example routing 500, the routing function determines to route tokens 2, 3, and 4 to expert 1 on device 0, tokens 1 and 5 to expert 2 on device 1, and token 6 to expert 3 on device 2.

Because the capacity factor is set to 1.0, the batch size for each device is equal to 2. Therefore, although the routing function has determined to route three tokens to device 0, this exceeds the batch size and one of the tokens (token 2, denoted by a dashed line) is skipped. However, only one of the devices (device 2) has been assigned a number of tokens that is less than the batch size. Therefore, the amount of wasted computation and memory is minimal but one of the six tokens is skipped.

In the routing 550, the routing function has made the same routing decisions: to route tokens 2, 3, and 4 to expert 1 on device 0, tokens 1 and 5 to expert 2 on device 1, and token 6 to expert 3 on device 2.

Because the capacity factor is set to 1.5, the batch size for each device is equal to 3. Therefore, even though the routing function has determined to route three tokens to device 0, this does not exceed the batch size and none of the tokens are skipped. However, device 1 and device 2 have been assigned a number of tokens that is less than the batch size. Therefore, the amount of wasted computation and memory is increased while decreasing the impact of skipped tokens. Moreover, additional unnecessary cross-device computation is required because device 0 must communicate data for six tokens total to device 1 and device 2 even though only three tokens total have been assigned to those devices.

The techniques described above allow the system to set the capacity factor to low values, e.g., closer to 1, while still achieving high quality performance. In other words, the techniques described above reduce the batch size that must be allocated for a given switch layer in order to ensure high quality performance when the switch layer is distributed across multiple hardware devices.

In particular, because the routing function always selects exactly one expert for each switch layer input, the capacity factor (and therefore the batch size) for each expert can be at least halved relative to all other conditional computation approaches because the maximum number of experts for every token is one.

Moreover, by training the neural network using the auxiliary loss described above encourages the neural network to achieve high levels of performance while distributing the switch layer inputs within a batch relatively evenly. This relatively even distribution allows the system to select lower capacity factors and batch sizes without adversely impacting performance of the training process or of the neural network after training.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing a machine learning task on a network input to generate a network output, the system comprising one or more computers and one or more storage devices storing instructions that, when executed by the one or more computers, cause the one or more computers to implement:
   a neural network that is configured to perform the machine learning task, wherein the neural network includes one or more switch layers, wherein each switch layer comprises:
      (i) a respective learned routing function having routing parameters, and
      (ii) a respective plurality of expert neural networks each having a respective set of expert parameters and each configured to receive a switch layer input for the switch layer and to process the switch layer input for the switch layer in accordance with the respective set of expert parameters for the expert neural network to generate a respective initial switch layer output for the switch layer, and wherein each switch layer is configured to:
   receive the switch layer input for the switch layer;
   apply the respective learned routing function in the switch layer to the switch layer input in accordance with current values of the routing parameters of the respective learned routing function to generate a score distribution that includes a respective routing score for each of the plurality of expert neural networks in the switch layer;
   select, from the plurality of expert neural networks, only the expert neural network having the highest routing score;
   process the switch layer input using only the selected expert neural network and in accordance with current values of the expert parameters of the selected expert neural network to generate an initial switch layer output for the layer input; and
   generate a final switch layer output for the switch layer, comprising computing a product of the routing score for the selected expert neural network and the initial switch layer output generated by the selected expert neural network.

2. The system of claim 1, wherein:
the neural network is an attention neural network configured to perform the machine learning task, the attention neural network comprising a plurality of layers, each layer comprising an attention sub-layer and a feed-forward sub-layer, the attention sub-layer configured to:
receive an input sequence for the layer comprising a respective layer input at each of one or more positions; and
generate an attended input sequence at least in part by applying an attention mechanism to the input sequence for the layer, the attended input sequence comprising a respective attended layer input at each of the one or more positions, and the feed-forward layer configured to:
receive the attended input sequence; and
generate an output sequence for the layer from the attended input sequence, the output sequence comprising a respective layer output at each of the one or more positions.

3. The system of claim 2, wherein, for at least one of the plurality of layers, the feed-forward sub-layer includes a switch layer, wherein each attended layer input is received as a different layer input to the switch layer, and wherein the feed-forward sub-layer is configured to generate the respective layer outputs at the one or more positions from the final switch layer outputs generated by the switch layer for the attended layer inputs.

4. The system of claim 3, wherein generating the respective layer outputs at the one or more positions from the final switch layer outputs generated by the switch layer for the attended layer inputs comprises:
applying a residual connection and normalization to the final switch layer outputs to generate the output sequence.

5. The system of claim 2, wherein, for at least one of the plurality of layers:
the attention mechanism applies one or more self-attention mechanisms,
each self-attention mechanism is applied to a respective set of queries, keys, and values generated from the input sequence for the layer, and
the attention mechanism includes a respective switch layer for each self-attention mechanism,
for each self-attention mechanism and for each layer input in the input sequence, the layer input is received as a layer input to the switch layer for the self-attention mechanism and the final switch layer output includes a respective query, key, and value for the layer input.

6. The system of claim 1, wherein the system includes a plurality of hardware devices, and wherein implementing the neural network comprises:
for each switch layer, executing each expert neural network in the switch layer on a different one of the plurality of hardware devices.

7. The system of claim 6, wherein, for each switch layer and for each expert neural network in the switch layer, the hardware device on which the expert neural network executes processes inputs to the expert neural network with a fixed batch size that is determined based on (i) a total number of expert neural networks in the switch layer, (ii) a total number of switch layer inputs required to be processed for a current batch of network inputs, and (iii) a fixed capacity factor that accounts for uneven distributions of switch layer inputs among the plurality of expert neural networks in the switch layer.

8. The system of claim 1, wherein, for each switch layer, the instructions cause the one or more computers to perform at least some of the operations of the routing function using a first computer number format that occupies a first number of bits in memory and perform the operations of the expert neural networks using a second computer number format that occupies a second, smaller number of bits in memory.

9. The system of claim 8, wherein the first computer number format is float32 and the second computer number format is bfloat16.

10. The system of claim 1, wherein, for each switch layer, the respective learned routing function in the switch layer is configured to:
apply a matrix of the routing parameters of the respective learned routing function to the switch layer input to generate a respective logit for each of the plurality of expert neural networks in the switch layer; and
apply a softmax to an input that comprises (i) the respective logits or (ii) noisy logits generated by applying noise to the respective logits to generate the score distribution.

11. The system of claim 10, when also dependent on any one of claim 8 or 9, wherein the switch layer is configured to convert the input to the softmax from the second computer number format to the first computer number format and convert the routing score for the selected expert neural network to the second computer number format prior to computing the product of the routing score and the initial switch layer output.

12. A method of training a neural network comprising one or more switch layers that each comprise a respective plurality of expert neural networks, the method comprising:
obtaining a batch of training network inputs and, for each training network input, a respective target network output;
processing each training network input in the batch using the neural network to generate a respective network output for each training network input; and
performing a training iteration to minimize an overall loss function that includes (i) a task-specific loss that measures, for each training network input in the batch, an error between the respective network output for the training network input and the respective target network output for each network input and (ii) a respective auxiliary loss for each switch layer that penalizes the switch layer for a) not assigning switch layer inputs received by the switch layer during the processing of the batch of training network inputs equally among the expert neural networks in the switch layer and b) not generating uniform score distributions for switch layer inputs received by the switch layer during the processing of the batch of training network inputs.

13. The method of claim 12, wherein the respective auxiliary loss for each switch layer is based on a dot product of (i) a first vector that includes, for each expert neural network in the switch layer, a respective value that measures a fraction of the switch layer inputs received by the switch layer during the processing of the batch of training network inputs that were routed to the expert neural network and (ii) a second vector that includes, for each expert neural network in the switch layer, a respective value that measures an average routing score generated by the routing function of the switch layer for the expert neural network for switch layer inputs received by the switch layer during the processing of the batch of training network inputs.

14. The method of claim 12, wherein, during the training and for each switch layer, at least some operations for computing the respective auxiliary loss for the switch layer are performed using a first computer number format that occupies a first number of bits in memory and operations of the expert neural networks are performed using a second computer number format that occupies a second, smaller number of bits in memory.

15. The method of claim 12, wherein the training comprises:
   initializing values of the parameters of the neural network by, for each parameter, drawing an element from a truncated Normal distribution with a standard deviation equal to a square root of a ratio between (i) a scale-hyperparameter and (ii) a number of input units in a weight tensor to which the parameter belongs, wherein the scale-hyperparameter is equal to a value between zero and 0.5.

16. The method of claim 15, wherein the scale-hyperparameter is equal to 0.1.

17. The method of claim 12, wherein the neural network is trained to perform an initial task and then fine-tuned on training data for the machine learning task, wherein the batch of training network inputs is part of the training data for the machine learning task, and wherein processing each training network input in the batch using the neural network to generate a respective network output for each training network input comprises:
   applying dropout to nodes within expert neural networks in the one or more switch layers with a first dropout rate; and
   applying dropout to nodes in layers of the neural network other than the switch layers with a second, lower dropout rate.

18. The method of claim 17, wherein the second dropout rate is less than or equal to 0.1 and the first dropout rate is greater than 0.1.

19. The method of claim 18, wherein the first dropout rate is 0.4.

20. A method comprising:
receiving a network input; and
processing the network input using a neural network that is configured to process the network input to generate a network output for a machine learning task, wherein the neural network includes one or more switch layers, wherein each switch layer comprises:
   (i) a respective learned routing function having routing parameters, and
   (ii) a respective plurality of expert neural networks each having a respective set of expert parameters and each configured to receive a switch layer input for the switch layer and to process the switch layer input for the switch layer in accordance with the respective set of expert parameters for the expert neural network to generate a respective initial switch layer output for the switch layer, and wherein each switch layer is configured to:
receive the switch layer input for the switch layer;
apply the respective learned routing function in the switch layer to the switch layer input in accordance with current values of the routing parameters of the respective learned routing function to generate a score distribution that includes a respective routing score for each of the plurality of expert neural networks in the switch layer;
select, from the plurality of expert neural networks, only the expert neural network having the highest routing score;
process the switch layer input using only the selected expert neural network and in accordance with current values of the expert parameters of the selected expert neural network to generate an initial switch layer output for the layer input; and
generate a final switch layer output for the switch layer, comprising computing a product of the routing score for the selected expert neural network and the initial switch layer output generated by the selected expert neural network.

* * * * *